United States Patent [19]

Lang

[11] 4,187,876
[45] Feb. 12, 1980

[54] SUB-SURFACE GATE VALVE

[75] Inventor: Heinrich Lang, Spring, Tex.

[73] Assignee: Combustion Engineering, Inc., Windsor, Conn.

[21] Appl. No.: 903,661

[22] Filed: May 8, 1978

[51] Int. Cl.[2] .................. F16K 3/02; F16K 31/524
[52] U.S. Cl. .................................. 137/594; 166/319; 251/58; 251/327
[58] Field of Search ............... 137/594; 166/319, 320; 251/58, 327

[56] References Cited

U.S. PATENT DOCUMENTS

| | | | |
|---|---|---|---|
| 2,503,469 | 4/1950 | Caldwell | 251/58 X |
| 4,029,289 | 6/1977 | Miffre | 251/58 |

Primary Examiner—Robert G. Nilson
Attorney, Agent, or Firm—Cushman, Darby & Cushman

[57] ABSTRACT

The gate for each conduit, of a preferably multiple conduit installation is transversally slidably mounted between full skirts. Dual hydraulic actuators drive a transversally extending rolling cam follow pin along an oblique path to slide the gate open and closed. The actuators have spring-assisted closure for fail safe operation, the actuator pistons being isolated from well pressure. Where there are two conduits so valved, the actuators for one extend longitudinally upwards from a central bulkhead, and the actuators for the other extend longitudinally downwards. Stem packing for the actuator piston rods is located in the central bulkhead. Modifications for accommodating, e.g. a third valved conduit are described. Also disclosed is a version with two, mutually inverted commonly housed gate valves controlling the same conduit.

13 Claims, 13 Drawing Figures

SUB-SURFACE GATE VALVE

BACKGROUND OF THE INVENTION

The apparatus of the present invention was developed as an improvement of the structures disclosed in McGee, Et Al Subsurface Gate Valve Safety Device, Ser. No. 794,020, now abandoned, for use in certain cases. It is intended by this reference to incorporate the disclosure of said prior application in this document.

In the gate valve of the aforesaid McGee, Et Al application, longitudinal motion of a remotely actuated operator was converted to transverse sliding of a gate by the cam-like internal Z-legged web of the hydraulic operator sliding against a part of the gate. With experience it was found that the sliding action resulted in excessive wear, due to the relatively great force level needed for effecting the sliding. The operator piston was exposed to well pressure; typically the operating pressure was at least or about 1.2×well pressure (e.g. 12,000 p.s.i.).

SUMMARY OF THE PRESENT INVENTION

The gate for each conduit, of a preferably multiple conduit installation is transversely slidably mounted between full skirts. Dual hydraulic actuators drive a transversally extending rolling cam follow pin along an oblique path to slide the gate open and closed. The actuators have spring-assisted closure for fail safe operation, the actuator pistons being isolated from well pressure. Where there are two conduits so valved, the actuators for one extend longitudinally upwards from a central bulkhead, and the actuators for the other extend longitudinally downwards. Stem packing for the actuator piston rods is located in the central bulkhead. Modifications for accommodating, e.g. a third valved conduit are described.

The gate valve of the preferred embodiment of the present invention represents an improvement in the following respects.

The cam operation involves rolling rather than sliding friction, with a consequent reduction in the force needed to actuate the gate by about 75 percent.

A typical dual valve version of the device of the invention is for controlling, e.g. two 2" conduits, two 3" conduits or one 2" conduit and one 4" conduit. In the latter instance, e.g., there may be provided a third valve for controlling a third conduit.

Because only the rod area on the operating pistons is exposed to well pressure, and not the full piston area, the operating pressure is reduced from 1.2×well pressure (e.g. from 1.2×10,000 p.s.i. well pressure=12,000 p.s.i. operating pressure) to about 1,500 p.s.i.

Manufacturing, assembling, testing and, particularly, service times are significantly reduced and lifetime is extended due to minimized friction and wear.

Multiple conduit control with plural, independently operable gates may be built into shorter housings, improving the market for the assemblies, especially by making them useful in additional phases of petroleum well drilling and production. For instance, the new valve is well suited to sub-sea production testing. In a 3-3/16" 10,000 p.s.i. well pressure tandem test tree version, the valve is, for instance, only one-third the length of the most widely used prior art test tree. Further, the new valve is also suited to use in below mudline and sea floor completions.

The principles of the invention will be further discussed with reference to the drawings wherein preferred embodiments are shown. The specifics illustrated in the drawings are intended to exemplify, rather than limit, aspects of the invention as defined in the claims.

DETAILED DESCRIPTION OF THE PRESENTLY PREFERRED EMBODIMENTS

Figure 1:
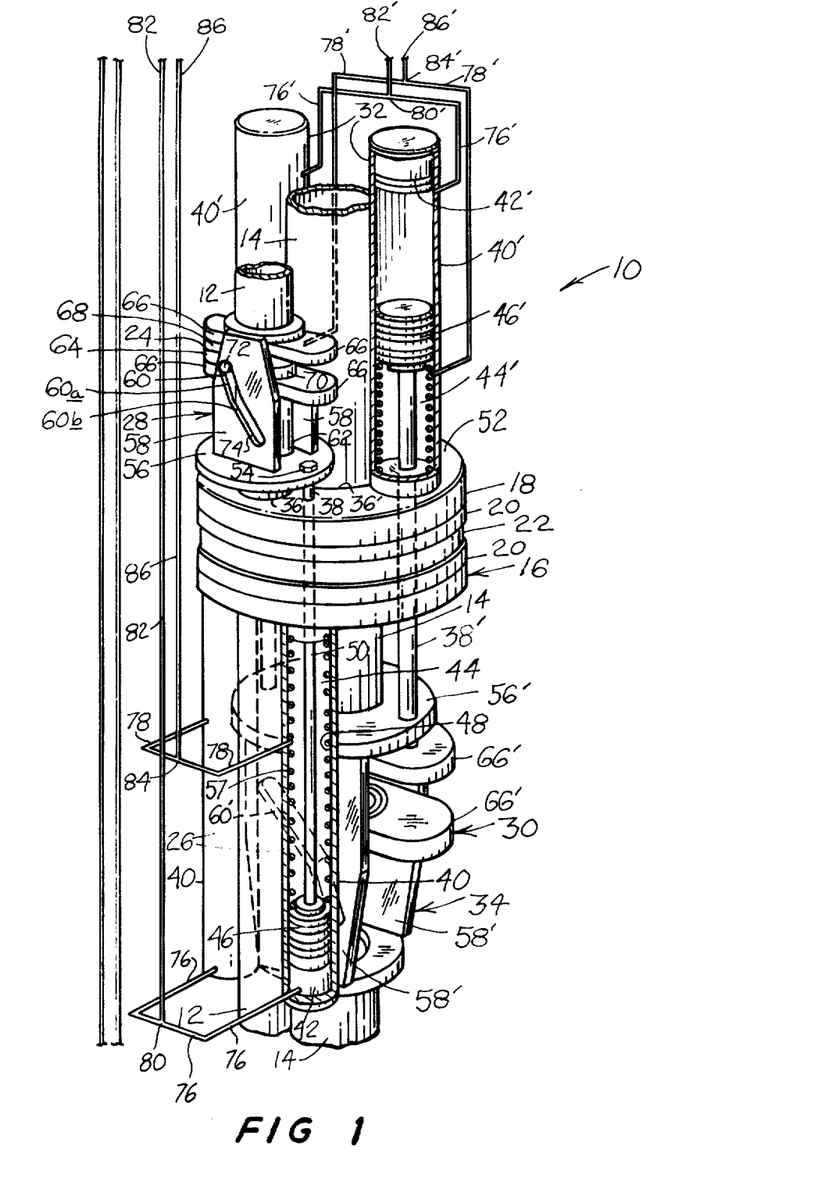
FIG. 1 is a perspective view of a first embodiment of the valve device, with some portions broken open and sectioned to expose interior detail, and with the housing removed.
Figures 2, 3, 5:
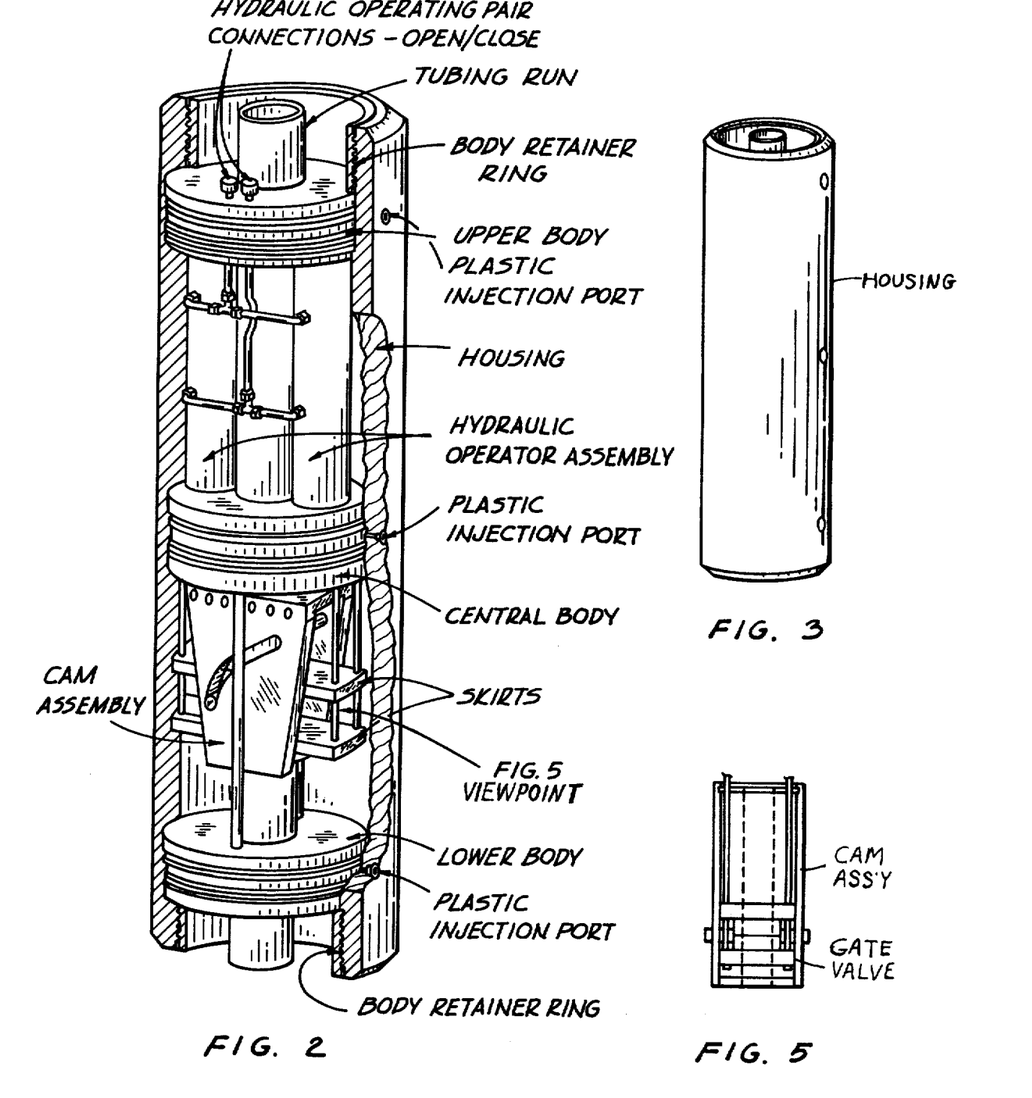
FIG. 2 is a similar perspective view of a second embodiment, with the housing present, but broken open and sectioned.
FIG. 3 is a perspective view of the housing.
FIG. 5 is a fragmentary side elevation view from the aspect indicated in FIG. 2.

In FIG. 1, there is depicted a multiple bore gate valve device 10 (minus its housing). The device 10 is to be interposed in two side-by-side strings of tubing (not shown) as means for controlling fluid flow through those strings. Within the device 10, conduits 12 and 14 constitute continuations of those strings of tubing. (Axially above and below the unshown housing, in practice, the conduits 12 and 14 will have respective flanges (not shown) for facilitating sealed interposition of the device 10 in the respective strings of tubing.)

Typically, the conduit 12 is a 2" conduit for interposition in a string of 2" tubing and conduit 14 is a 4" conduit for interposition in a string of 4" tubing.

The device 10 further includes a transversely extending, axially short central bulkhead 16, intermediate the axial extent of the device. The central bulkhead 16 acts as a mounting and sealing device for several of the parts which are to be described below. Further, the generally disk shaped central bulkhead 16 has in its radially outer, cylindrically curved surface 18 two axially spaced, circumferentially extending seal members 20, with a radially outwardly opening groove 22 axially between them for receipt of conventional plastic sealant material through a plastic injection port (not shown) of the housing (not shown). The seal members 20 and plastic sealant form a circumferential seal between the central bulkhead and the housing intermediate the length of the device 10.

In general, the device 10 further includes a first gate valve 24 interposed in the first conduit 12 above the central bulkhead, axially downwardly extending dual actuators 26 for the first gate valve 24 and a cam assembly 28 for translating vertical, axial movement provided by the dual actuators 26 into horizontal, transverse movement of the first gate valve. In addition, the device 10 includes a second gate valve 30 interposed in the second conduit below the central bulkhead, axially upwardly extending dual actuators 32 for the second gate valve 30 and a cam assembly 34 for translating vertical, axial movement provided by the dual actuators 32 into horizontal, transverse movement of the second gate valve.

The first conduit 12 passes through the central bulkhead at 36. Within the central bulkhead, conventional packing (not shown) forms a circumferential seal between the exterior of the first conduit and the surrounding central bulkhead.

At two diametrically opposed sites perimetrically of the opening means 36, the central bulkhead 16 is provided with axial opening means 38. Where these exit on the underside of the central bulkhead, respective axially extending hydraulic cylinders 40 are sealingly secured to the central bulkhead coaxially surrounding the openings 38. The cylinders 40 are closed by heads 42 at their lower ends and enclose between the heads 42 and the central bulkhead 16, respective cylinder chambers 44. Each cylinder chamber 44 receives a piston 46 therein in sliding, sealed, circumferential engagement with the internal sidewall surface 48. A respective piston rod 50 is coaxially secured to each piston 46 and extends up through the openings 38 all the way through the central bulkhead 16 and out the top 52 of the central bulkhead 16. There, each piston rod is secured, e.g. by bolts 54 to a transversally extending first end plate 56 of the first cam assembly 28.

Conventional packing (not shown) is provided within the central bulkhead circumferentially of each piston rod 50, providing a sliding seal between the respective piston rod and the central bulkhead.

Within each cylinder chamber 44, a compression coil spring 57 is coaxially provided, surrounding the respective piston rod and located to bear between the respective piston 46 and the central bulkhead 16. Accordingly, the coil springs 57 act, when compressed by upward movement of the pistons 46, to tend to push the pistons back downwards.

The first cam assembly 28 further includes two transversally spaced, parallel, planar, vertically upwardly extending cam plates 58 having identically shaped cam slots 60 therethrough in a thickness sense, which are in lateral alignment with one another from end to end.

In the preferred embodiment, as shown, each slot 60 has a first portion 60a, distally of the end plate 56 which extends obliquely quite steeply, and a second portion 60b, proximally of the end plate 56 which also extends obliquely, but less steeply than the first portion. In the instance depicted, the first portions 60a constitute about one-third of the lengths of the respective slots and are angled at about 15° to the longitudinal axis of the device 10 and the second portions 60b are angled at about 45° to the longitudinal axis of the device 10. Although, in the instance depicted there is a rather definite elbow where the respective portions 60a and 60b intersect, a more gradually curved transition may be provided.

Between the cam plates 58, centrally of the end plate 56 there is a central opening 62 through the end plate, through which the conduit 12 freely passes.

The first gate valve 24 is interposed in the conduit 12 at a site laterally between the cam plates 58, on the axially opposite side of the end plate 56 from the central bulkhead 16.

The first gate valve 24 includes a drive pin journalling valve gate 64, transversally slidably received between the individuals of a pair of full skirted seats 66. (In this figure, the seats 66' of the second gate valve show more clearly, because in this latter instance only, for illustrative purposes, the gate has been removed. The gate 64 is identical to the gate shown in FIG. 6.)

The gate 64 includes an upper half 68 and a lower half 70 which may be of identical construction, each having a through bore laterally adjacent a blind region. An annular junk ring (not shown in FIG. 1) continues the conduit 12 between the bores of the gate halves.

The exterior, axially outer sides of gate halves facially engage the corresponding opposed sides of the respective full skirted valve seats. The latter are provided with sealing ring means for sealing with the respective gate sides, and these sealing ring means may be of conventional construction.

Figures 4, 6:
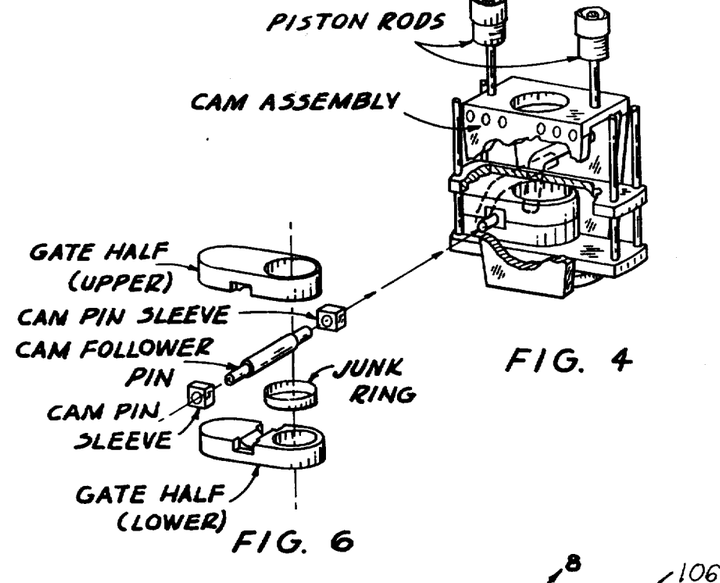
FIG. 4 is a fragmentary perspective view of one valve cam assembly of the device of FIG. 2.
FIG. 6 is an exploded perspective view of one valve gate of the device of FIG. 2.

The interior, axially inner sides of the gate halves journal between them a cam follower pin 72. A typical way this may be done is illustrated in FIG. 6: The inner sides have corresponding transversally extending grooves which mate to provide a transverse passageway that is of circular cross-section in the middle and of enlarged, non-circular cross-section at the ends. The cam follower pin 72 is correspondingly circular in its mid-section, and of reduced circular section at its ends. The non-circular portions of the transverse passageway receive respective cam pin sleeves. These have correspondingly non-circular radially outer perimetrical surfaces and circular bores. The two circular bores receive and journal for rotation the two reduced-diameter outer portions of the cam follower pin. The cam follower pin 72 is sufficiently longer than the gate 64 (including the cam pin sleeves) is wide, so the outer ends of the reduced-diameter outer portions of the cam follower pin protrude in opposite directions into the respective slots 60 of the respective cam plates 58.

Within the slots 60, the outer cylindrical surfaces of the cam follower pin opposite end portions are in rolling engagement with the slot-bounding surface 74.

Each hydraulic cylinder chamber 44 is provided with two hydraulic lines communicating therewith through the respective cylinder, including a first one at 76 axially opposite the central bulkhead from the respective piston 46 for driving the piston axially towards the central bulkhead, i.e. "up" in this instance, and a second one at 78 axially between the bulkhead and the respective piston 46 for driving the piston axially away from the central bulkhead 16, i.e. "down" in this instance. At 80, the two individual "up" hydraulic lines are headdered into a common first hydraulic line 82. Likewise at 84, the two individual "down" hydraulic lines are headdered into a common second hydraulic line 86.

The second gate valve 30, dual actuators 32 and cam assembly 34, are on the axially opposite side of the respective central bulkhead from the corresponding first structures 24, 26, 28, and are laterally displaced therefrom, being provided for the second conduit 14. Thus, in this instance, the cylinders 40' of the dual actuators 32 extend axially upwardly above the central bulkhead 16, and the second gate valve 30 is located axially below the central bulkhead. In other words, the first and second structures are inverted 180° relative to one another. Accordingly, corresponding elements of the second structures are correspondingly numbered, but primed and the details thereof will not be repeated here.

In practice, the lines 76 - 86, 76' - 86' are provided within and/or extend within the housing (not shown) and are provided with four respective fittings (not shown) in the upper end (not shown) of the housing.

The housing may further be provided with additional hydraulic and/or other-powered control lines 88 (two are shown) extending therein and/or therethrough, and e.g. terminating in respective fittings (not shown) in the opposite ends of the housing. These permit connection with and remote control from the surface of other down-hole structures, such as sub-surface safety valves, and/or the reporting of data gathered by down hole sensing devices to a remote control station.

For each gate valve 24 or 30, the use of dual actuators 26 or 32, powered by common lines 82, 86 or 82', 86' assures that the respective cam drive assembly will operate in alignment with the drive pin 72 without cocking, and provides the piston area necessary for actuation at designed operating pressure, typically about 1,500 p.s.i. As aforementioned, stem packing assemblies (not shown) received within the central bulkhead seal about the piston rods 50, 50'', isolating the chambers 44 from the respective housing cavities within which the valves 24 and 30 are located on opposite sides of the central bulkhead 16.

For each valve 24 or 30, during the opening half-cycle thereof, the respective dual pistons axially move the cam assembly axially away from the central bulkhead. The drive pin 72 rolls along the cam slot bounding surfaces 74, initially in the more nearly vertical portion 60a, which results in relatively slow transverse sliding of the respective gate. Upon further travel of the respective dual pistons, the drive pin 72 rolls along the more nearly horizontal portion 60b, which results in an increased speed of opening. Should there be a failure of hydraulic pressure, the affected valve or valves will close, due to restoration force provided by the compressed coil springs, and due to the force of valve cavity pressure (within the housing on the respective side of the central bulkhead) acting on respective drive stems. The spring force preferable is that which will close the respective valve even absent any assistance from valve cavity pressure.

The construction shown in FIG. 1 represents but one of several valve configurations possible, e.g. for where the first and second conduits are of 2" and 4" size, respectively. Such a valve device 10, including its housing, is typically 19½' O.D., and 64½" in length. Within such an envelope there is sufficient space to further provide an annulus bore and respective valve assembly (not shown). Instead of a 4"×2"×1" device 10 as just described, a 3"×3"×2" triple bore valve assembly could be provided, necessitating only that the housing envelope be made longer.

A similar construction, but for a single valve assembly for controlling a single conduit is shown in FIGS. 2–6, wherein the corresponding parts are labeled with legends. In this version the cam plates of the cam assembly are shown provided with somewhat more bracing (which could be provided for the FIG. 1 version as well).

Figure 7:
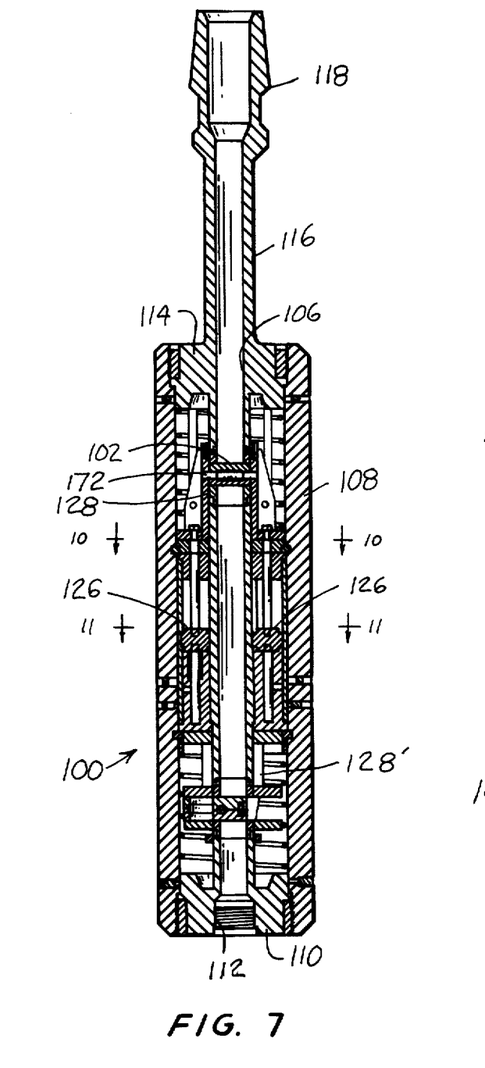
FIG. 7 is a longitudinal sectional view substantially on lines 7—7 of FIGS. 9-11 of a sub-sea test valve incorporating principles of the present invention.

The adaptability of the principles of the invention to other structures, in this instance also in the petroleum well art, is illustrated by the device 100 of FIGS. 7 and following.

Figure 8:
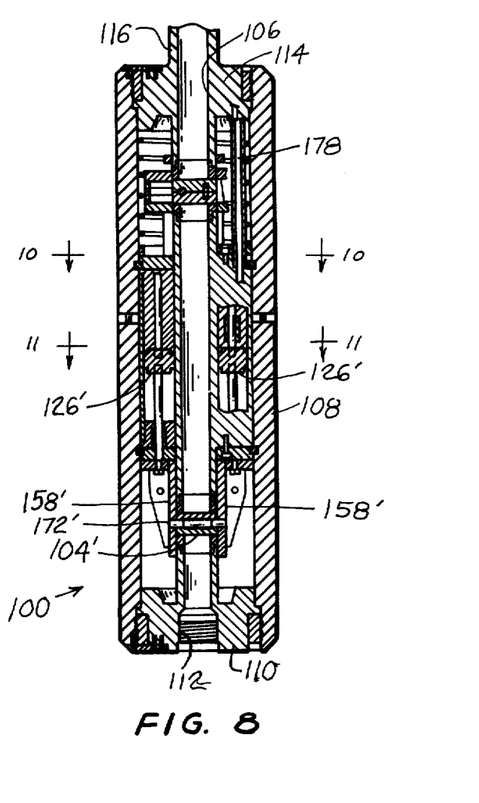
FIG. 8 is a fragmentary longitudinal sectional view thereof, taken on lines 8—8 of FIG. 9-11.
Figure 9:
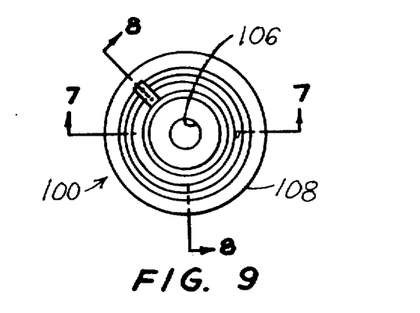
FIG. 9 is a top plan view thereof.
Figure 10:
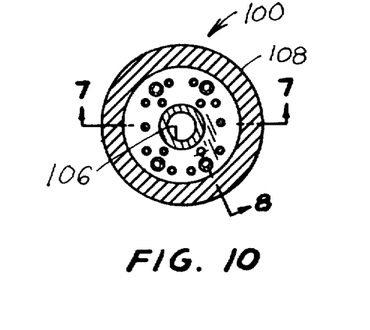
FIG. 10 is a transverse sectional view thereof on lines 10—10 of FIGS. 7 and 8.
Figure 11:
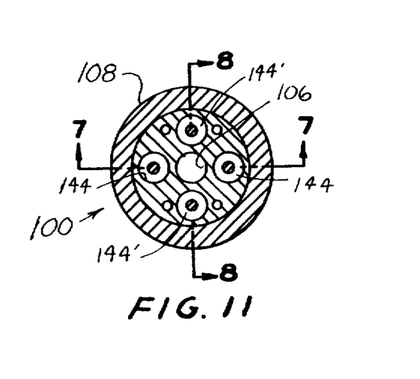
FIG. 11 is a transverse sectional view thereof on lines 11—11 of FIGS. 7 and 8.

The device 100 is a sub-sea test valve, a type of valve for a particular use well known in the art. In general, the test valve device 100 provides a series of two jointly operable gates valves 102, 104' interposed in the same conduit 106, in a common housing 108, with relatively short axial spacing between them. Where the conduit 106 emerges through the lower end wall 110 of the housing 108, it is provided with means such as interior threading 112 for connecting the device with a depending string of pipe (not shown). Where the conduit 106 emerges through the upper end wall 114 of the housing 108 it has a tubular, coaxially upward extension 116, which terminates in an annular flange 118, the profile of which shows best in FIGS. 7 and 8, for connecting the device 100 in depending relation to an upwardly extending conduit member, the preferred nature of which is discussed below in relation to FIGS. 12 and 13.

The gate valves 102 and 104, although being angularly offset by 90° and interposed in the same conduit, are inverted 180° relative to one another to make the device more compact, as in the FIG. 1 embodiment. Thus, corresponding parts are given like numerals, raised by 100, and the detailed explanation will not be repeated here. One difference should be noted, instead of each actuator chamber 144, 144' housing a compression coil spring, the coil springs 157, 157' are coaxially disposed, one each in the relatively opposite valve chambers. Their purpose remains the same—to act on the actuator of an opened gate valve in a sense to restore that gate valve to a closed condition.

Figure 12:
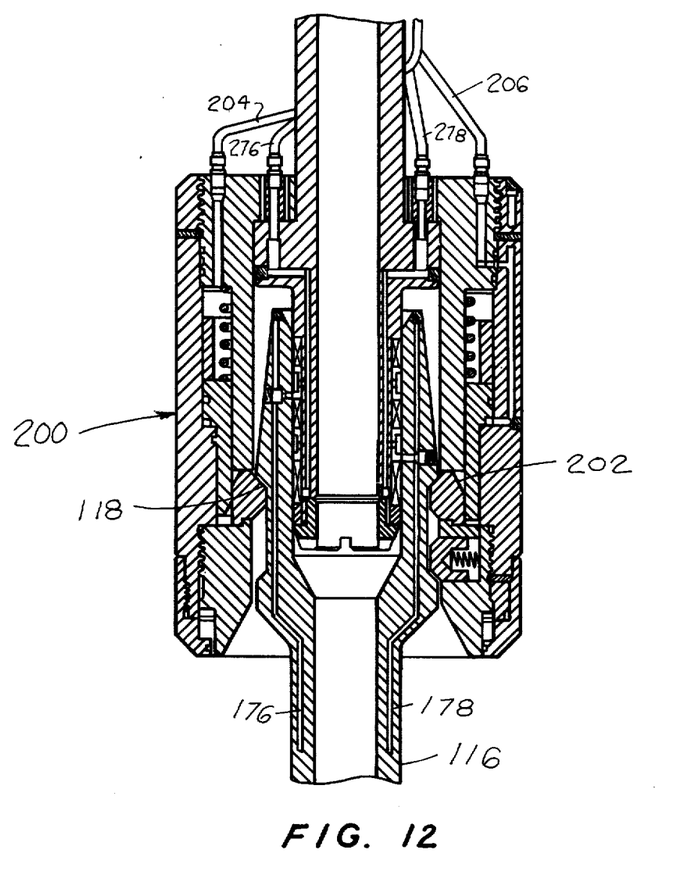
FIG. 12 is a fragmentary longitudinal sectional view showing the apparatus of FIGS. 7-11 suspended from a remotely operable hydraulic connector.
Figure 13:
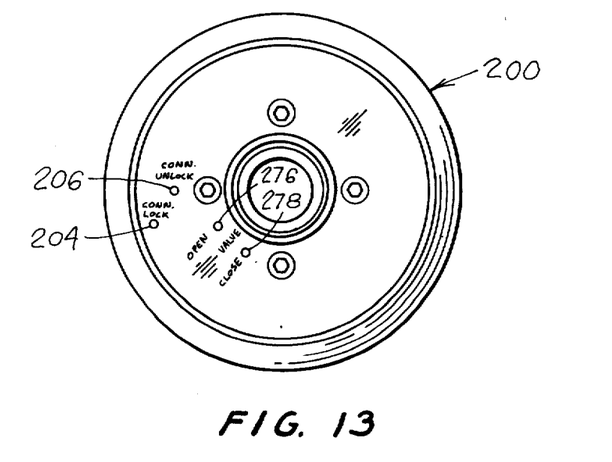
FIG. 13 is a top plan view of the connector of FIG. 12.

In FIGS. 12 and 13, structure 200 is a remotely operable conduit connector, in this instance a sub-sea equipment hydraulically-operated connector adapted to be mechanically disconnected should the need arise. This basic device is now well-known in the art. A further description of the basic device is found in the prior U.S. patent of Nolar, Jr., et al U.S. Pat. No. 3,523,578, issued Aug. 11, 1970, in respect to item 84 in FIG. 2a thereof.

In general, the connector 200 is provided with hydraulically-operated cam and latch means 202. When the connector 200 is lowered onto the upwardly projecting sub of the test valve device 100, and hydraulic pressure applied through the line 204, the connector 200 becomes latched and sealed to the test valve device 100. When hydraulic pressure is, instead, applied through the line 206, the connector 200 becomes unlatched from the test valve device 100 and may be withdrawn axially upwardly and free thereof. The connector 200 includes a longitudinal throughbore 206 which becomes an upward extension of the throughbore of the test valve device 100 when the two devices are latched and sealed together.

For use with the present invention, the connector 200 is modified to have two additional passageways therethrough with respective fittings in the upper end thereof. When the devices 200 and 100 are latched and sealed together one of these passageways, 276, provides an hydraulic pressure communication with the passageway 176 of the test valve device 100, and the other, 278, provides an hydraulic pressure communication with the passageway 178 of the test valve device. Thus, hydraulic pressure applied via the fittings of the connector 200 as marked in FIG. 13 will open and close the valve gates 102, 104.

The device 100 is assembled by usual techniques of engaging threading, installing snap rings, fitting keys in keyways, and has a complete complement of usual sealing ring and packing means and plastic sealant injection ports, for instance as illustrated. Further, for use as a test valve, the device 100 may be provided, as necessary, with suitable test ports, for instance, as illustrated.

It should now be apparent that the sub-surface gate valve as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A gate valve device, comprising:
   a tubular housing having opposite end walls, enclosing at least one valve cavity;
   an internal bulkhead extending crosswise of the housing, said at least one valve cavity being defined between a respective one of said end walls and said bulkhead;
   means providing a longitudinal throughbore extending axially between the opposite end walls of said housing;
   a gate valve interposed in said longitudinal throughbore within said one valve cavity, said gate valve including a valve gate transversally slidably disposed between two respectively confronting, full skirted valve seats;
   the valve gate including a drive pin means having end portions laterally extending therefrom in two opposite directions and means journalling said drive pin on said valve gate for rotation about its own longitudinal axis;
   means in said housing but isolated from said one valve cavity by said internal bulkhead defining a pair of longitudinally extending hydraulic cylinders, arranged laterally adjacent one another but on at least generally diametrically opposite sides of said longitudinal throughbore;
   means defining a pair of piston rod-passing openings through the bulkhead coaxially with the respective ones of said cylinders;
   a piston slidingly received in each cylinder and having a respective piston rod connected thereto and extending therefrom slidingly, sealingly through the respective one of said piston rod-passing openings and into said one valve cavity;
   first hydraulic line means communicated through the housing with each hydraulic cylinder in such sense as to drive the pistons toward the internal bulkhead when hydraulic pressure is admitted to the hydraulic cylinders therethrough;
   second hydraulic line means communicated through the housing with each hydraulic cylinder in such sense as to drive the pistons away from the internal bulkhead when hydraulic pressure is admitted to the hydraulic cylinders therethrough;
   a cam assembly disposed within said one valve cavity and including:
   (a) end plate means connecting between both piston rods; and
   (b) two laterally spaced cam plate means flanking said gate valve, each cam plate means having a cam surface means maintained in contact with a respective end portion of said drive pin means, so that said drive pin means may roll thereupon as said cam assembly is axially moved by axial extension and retraction of said pistons;
   said cam surface means being obliquely oriented relative to the longitudinal axis of said housing, for converting longitudinal movement of said pistons into transverse movement of said valve gate.

2. The apparatus of claim 1, wherein:
   each cam surface means includes a first portion that is closer to essentially longitudinal extent and an adjoining second portion that is closer to essentially transverse extent, these being in such order as to cause the valve gate when being opened to initially move relatively slowly for each unit of piston travel and later to move relatively rapidly for each unit of piston travel.

3. The apparatus of claim 2, wherein:
   each cam surface means is provided by a slot in the respective cam plate means, each slot receiving a respective drive pin end portion.

4. The apparatus of claim 1, further including:
   compression coil spring means bearing between said housing and one of said cam assembly and said pistons in a sense to become compressed as said gate valve is opened, and to tend to close said gate valve when compressed, said compression coil spring means, when compressed having sufficient restoration force to close said gate valve even absent assistance from pressure in said one valve cavity.

5. The gate valve device of claim 1, further comprising:
   said tubular housing further enclosing second valve cavity disposed on the axially opposite side of said bulkhead from said one valve cavity between said bulkhead and the opposite end of said housing end walls;
   means providing a second longitudinal throughbore extending axially between the opposite end walls of said housing;
   a second gate valve interposed in said second longitudinal throughbore within said second valve cavity, said second gate valve including a second valve gate transversally slidably disposed between two respectively confronting, full skirted valve seats;
   the second valve gate including a second drive pin means having end portions laterally extending therefrom in two opposite directions and means journalling said second drive pin on said second valve gate for rotation about its own longitudinal axis;
   means in said housing but isolated from said second valve cavity by said internal bulkhead defining a second pair of longitudinally extending hydraulic cylinders, arranged laterally adjacent one another but on at least generally diametrically opposite sides of said longitudinal throughbore;
   means defining a second pair of piston rod-passing openings through the bulkhead coaxially with the respective ones of said second cylinders;
   a second piston slidingly received in each second cylinder and having a respective second piston rod connected thereto and extending therefrom slidingly, sealingly through the respective one of said second piston rod-passing openings and into said second valve cavity;

said first hydraulic line means also being communicated through the housing with each second hydraulic cylinder in such sense as to drive the second pistons toward the internal bulkhead when hydraulic pressure is admitted to the second hydraulic cylinders therethrough;

said second hydraulic line means also being communicated through the housing with each second hydraulic cylinder in such sense as to drive the second pistons away from the internal bulkhead when hydraulic pressure is admitted to the second hydraulic cylinders therethrough;

a second cam assembly disposed within said second valve cavity and including:

(a) end plate means connecting between both second piston rods; and (b) two laterally spaced cam plate means flanking said second gate valve, each complete means having a cam surface means maintained in contact with a respective end portion of said second drive pin means, so that said second drive pin means may roll thereupon as said second cam assembly is axially moved by axial extensions and retraction of said second pistons;

said cam surface means of said second cam assembly being obliquely oriented relative to the longitudinal axis of said housing, for converting longitudinal movement of said second pistons into transverse movement of said second valve gate.

6. The apparatus of claim 5, wherein:

each cam surface means of said second cam assembly includes a first portion that is closer to essentially longitudinal extent and an adjoining second portion that is closer to essentially transverse extent, these being in such order as to cause the second valve gate when being opened to initially move relatively slowly for each unit of second piston travel and later to move relatively rapidly for each unit of second piston travel.

7. The apparatus of claim 6, wherein:

each cam surface means of said second cam assembly is provided by a slot in the respective cam plate means, each slot receiving a respective second drive pin end portion.

8. The apparatus of claim 5, further including:

second compression coil spring means bearing between said housing and one of said second cam assembly and said second pistons in a sense to become compressed as said second gate valve is opened, and to tend to close said second gate valve when compressed, said second compression coil spring means, when compressed having sufficient restoration force to close said second gate valve even absent assistance from pressure in said second valve cavity.

9. The apparatus of claim 5 wherein:

said first hydraulic line means for said first hydraulic cylinder is isolated from said first hydraulic line means for said second hydraulic cylinder; and said second hydraulic means for said first hydraulic cylinder is isolated from said second hydraulic line means for said second hydraulic cylinder, so that the two gate valves may be opened and closed independently of one another.

10. The gate valve device of claim 1, further comprising:

said tubular housing further enclosing second valve cavity disposed on the axially opposite side of said bulkhead from said one valve cavity between said bulkhead and the opposite end of said housing end walls;

a second gate valve interposed in said longitudinal throughbore with axial spacing from the first-described gate valve and within said second valve cavity, said second gate valve including a second valve gate transversally slidably disposed between two respectively confronting, full skirted valve seats;

the second valve gate including a second drive pin means having end portions laterally extending therefrom in two opposite directions and means journalling said second drive pin on said second valve gate for rotation about its own longitudinal axis;

means in said housing but isolated from said second valve cavity by said internal bulkhead defining a second pair of longitudinally extending hydraulic cylinders, arranged laterally adjacent one another but on at least generally diametrically opposite sides of said longitudinal throughbore;

means defining a second pair of piston rod-passing openings through the bulkhead coaxially with the respective ones of said second cylinders;

a second piston slidingly received in each second cylinder and having a respective second piston rod connected thereto and extending therefrom slidingly, sealingly through the respective one of said second piston rod-passing openings and into said second valve cavity;

said first hydraulic line means also being communicated through the housing with each second hydraulic cylinder in such sense as to drive the second pistons toward the internal bulkhead when hydraulic pressure is admitted to the second hydraulic cylinders therethrough;

said second hydraulic line means also being communicated through the housing with each second hydraulic cylinder in such sense as to drive the second pistons aways from the internal bulkhead when hydraulic pressure is admitted to the second hydraulic cylinders therethrough;

a second cam assembly disposed within said second valve cavity and including:

(a) end plate means connecting between both second piston rods; and (b) two laterally spaced cam plate means flanking said second gate valve, each complete means having a cam surface means maintained in contact with a respective end portion of said second drive pin means, so that said second drive pin means may roll thereupon as said second cam assembly is axially moved by axial extension and retraction of said second pistons;

said cam surface means of said second cam assembly being obliquely oriented relative to the longitudinal axis of said housing, for converting longitudinal movement of said second pistons into transverse movement of said second valve gate.

11. The apparatus of claim 10, wherein:

each cam surface means of said second cam assembly includes a first portion that is closer to essentially longitudinal extent and an adjoining second portion that is closer to essentially transverse extent, these being in such order as to cause the second valve gate when being opened to initially move relatively slowly for each unit of second piston travel and later to move relatively rapidly for each unit of second piston travel.

12. The apparatus of claim 11, wherein:
each cam surface means of said second cam assembly is provided by a slot in the respective cam plate means, each slot receiving a respective second drive pin end portion.

13. The apparatus of claim 10, further including:
second compression coil spring means bearing between said housing and one of said second cam assembly and said second pistons in a sense to become compressed as said second gate valve is opened, and to tend to close said second gate valve when compressed, said second compression coil spring means, when compressed having sufficient restoration force to close said second gate valve even absent assistance from pressure in said second valve cavity.

* * * * *